Patented Mar. 16, 1926.

1,576,732

UNITED STATES PATENT OFFICE.

OTTO H. ESCHHOLZ AND PAUL G. GUEST, OF WILKINSBURG, PENNSYLVANIA, ASSIGNORS TO WESTINGHOUSE ELECTRIC AND MANUFACTURING COMPANY, A CORPORATION OF PENNSYLVANIA.

ARC-RESISTING MATERIAL AND PROCESS OF MAKING.

No Drawing. Application filed July 30, 1920. Serial No. 400,233.

*To all whom it may concern:*

Be it known that we, OTTO H. ESCHHOLZ, a citizen of the United States, and a resident of Wilkinsburg, in the county of Allegheny and State of Pennsylvania, and PAUL G. GUEST, a citizen of the United States, and a resident of Wilkinsburg, in the county of Allegheny and State of Pennsylvania, have invented a new and useful Improvement in Arc-Resisting Materials and Processes of Making, of which the following is a specification.

This invention relates to refractory material, and, more especially, a material adapted for use as arc-chute and arc-splitter material.

For use as arc-resisting material in arc chutes, as arc splitter and arc-chute-side material, a substance that is at once refractory, possesses a high resistance to fracture and to the passage of an electric current, which remains refractory and non-hydroscopic in service, and which may readily be shaped into a wide variety of forms, is desirable. Hitherto, in the manufacture of such material, a base of refractory material was mixed with a cementing body, such as Portland cement, and water, and cold-molded. Arc-stream contact with such material produces a characteristic eroded and discolored surface. The erosion causes a rapid depreciation of the chute while the discoloration decreases the insulation resistance.

Our invention is designed to eliminate these disadvantages, it being among the objects thereof to produce an arc-resisting material which is very refractory, has adequate mechanical strength, is non-hydroscopic and resistant to arc wear, retaining its insulating qualities throughout its life.

In practicing our invention, we provide a refractory material, preferably granular, such as sand, and mix therewith a refractory inorganic binder, such as sodium silicate. The plastic mass is then formed into the desired shape and baked under such conditions that the material retains flexibility in the finished objects. By using coarse-grained particles, the strength of the structure and resistance to erosion are greatly increased. The material, after forming, is baked at a low temperature, approximately 100° or 150° C. This baking temperature allows the material to retain some combined water which appears to give it sufficient plasticity, in conjunction with the large grains, to resist strains produced by a wide range of localized temperature variations without developing visible cracks or apparent change in strength.

Upon deflecting an arc stream against this new material, the material does not erode or discolor, the high temperature and energy concentration of the arc serving to produce a thin surface glaze. This glaze, by virtue of its high thermal resistance, prevents rapid conduction of the thermal energy to the body of the chute, thereby causing it to retain its original plastic character which permits neutralization of strains produced by the arc passage. It is evident, therefore, that service conditions tend to make the arc chute material more resistant to arc wear.

We may, if desired, form a thin surface glaze on the arc-resisting material, after baking, by subjecting the surface to be exposed to an arc stream, to an arc for a relatively long time, one or more seconds, in order to form the glazed film thereon. By thus exposing the material, we subject it to far more severe conditions than it would be subjected to in practice, thus fully testing the material, and, at the same time, we form the film of sodium silicate on the surface which effectually guards against erosion by the arc stream.

Although we have specifically described the making of an arc-resisting material, of sand and sodium silicate, or water glass, it is to be understood that my invention is not limited to the use of these specific materials since other materials having the characteristics of those described may be used with good results. For instance, instead of using sand for the refractory base, we may add thereto, or substitute therefor, some other inorganic refractory material, as magnesium oxide, asbestos, etc. My invention includes broadly the combination of a refractory inorganic material with a refractory inorganic binder molded and baked at a relatively low temperature which assures adequate strength of structure, together with the ability to withstand the application of internal and external stresses on account of the inherent plasticity of the material and increased resistance to arc wear.

Having thus fully described our said invention, what we claim as new and desire to secure by Letters Patent is:—

1. A refractory article comprising a refractory base including silica and a hydrous inorganic binder of sodium silicate, and having a thin glaze of anhydrous sodium silicate on the surface thereof.

2. A refractory article comprising a refractory base including silica and a hydrous inorganic binder.

3. Arc-resisting material comprising a refractory base including silica and a hydrous inorganic binder of sodium silicate.

4. A method of making refractory material which comprises forming a plastic mass of a refractory base and an inorganic binder of hydrous sodium silicate and baking the same at a relatively low temperature so that the finish material retains a considerable degree of flexibility.

5. A method of making refractory material which comprises forming a plastic mass of a refractory base including silica and an inorganic binder and baking the same at such a temperature that some water is retained in the material.

6. A method of making refractory material which comprises forming a plastic mass of a refractory base including silica and a hydrous inorganic binder of sodium silicate, baking the same, and then forming a thin glaze of an anhydrous material containing sodium silicate on the surface thereof.

7. A method of making refractory material which comprises forming a plastic mass of a refractory base including silica and a hydrous inorganic binder of sodium silicate and then baking the same at a temperature of approximately 150° C.

In testimony whereof, we have hereunto subscribed our names this 26th day of July, 1920.

OTTO H. ESCHHOLZ.
PAUL G. GUEST.